US012362162B2

(12) United States Patent
Wildgoose et al.

(10) Patent No.: US 12,362,162 B2
(45) Date of Patent: Jul. 15, 2025

(54) ION GUIDE ASSEMBLY HAVING MULTIPLE ION GUIDES

(71) Applicant: Micromass UK Limited, Wilmslow (GB)

(72) Inventors: Jason Wildgoose, Stockport (GB); Darren Hewitt, Pennington (GB); Matthew Collier, Warrington (GB); Oliver Malpas, Congleton (GB)

(73) Assignee: Micromass UK Limited, Wilmslow (GB)

( * ) Notice: Subject to any disclaimer, the term of this patent is extended or adjusted under 35 U.S.C. 154(b) by 393 days.

(21) Appl. No.: 17/906,548

(22) PCT Filed: Mar. 19, 2021

(86) PCT No.: PCT/GB2021/050689
§ 371 (c)(1),
(2) Date: Sep. 16, 2022

(87) PCT Pub. No.: WO2021/186192
PCT Pub. Date: Sep. 23, 2021

(65) Prior Publication Data
US 2023/0162964 A1    May 25, 2023

(30) Foreign Application Priority Data
Mar. 19, 2020   (GB) ..................... 2004014

(51) Int. Cl.
*H01J 49/06*    (2006.01)
*G01N 27/622*   (2021.01)

(52) U.S. Cl.
CPC .......... *H01J 49/065* (2013.01); *G01N 27/622* (2013.01); *H01J 49/067* (2013.01); *H01J 49/068* (2013.01)

(58) Field of Classification Search
CPC ...... H01J 49/062; H01J 49/063; H01J 49/065; H01J 49/067; H01J 49/068; H01J 49/069;
(Continued)

(56) References Cited

U.S. PATENT DOCUMENTS 9,190,256 B2   11/2015   Brown et al.
9,368,334 B2   6/2016    Steiner
(Continued)

FOREIGN PATENT DOCUMENTS

| CN | 104641451 A | 5/2015 |
| CN | 206179824 U | 5/2017 |
| CN | 110709962 A | 1/2020 |

OTHER PUBLICATIONS

Search Report for GB Application No. GB2004014.3, mailed Dec. 17, 2020.
(Continued)

*Primary Examiner* — David E Smith
*Assistant Examiner* — Hsien C Tsai
(74) *Attorney, Agent, or Firm* — Goodwin Procter LLP

(57) ABSTRACT

An ion guide assembly (2) is disclosed comprising: two planar mounting components (4); and first and second ion guides (6,8) mounted on the two planar mounting components such that the ion guides are spaced apart from each other, wherein at least one of the planar mounting components has an aperture (14) therethrough that is located between the positions on said at least one mounting component at which the first and second ion guides are mounted; and an ion optical device sized and configured to be inserted through the aperture in the planar mounting component and into the space between the first and second ion guides.

20 Claims, 3 Drawing Sheets

(58) Field of Classification Search
CPC ...... H01J 49/4255; H01J 49/005; H01J 49/40; G01N 27/622
See application file for complete search history.

(56) References Cited

U.S. PATENT DOCUMENTS

| | | |
|---|---|---|
| 2012/0286150 A1 | 11/2012 | Muntean |
| 2015/0021468 A1* | 1/2015 | Steiner .................. H01J 49/068 250/281 |
| 2016/0169837 A1 | 6/2016 | Bateman et al. |
| 2017/0287689 A1 | 10/2017 | Gill et al. |

OTHER PUBLICATIONS

International Search Report and Written Opinion for International Application No. PCT/GB2021/050689, mailed Jun. 21, 2021.
Combined Search and Examination Report for GB Application No. GB2103852.6, mailed Jul. 15, 2021.
Office Action for Chinese Patent Application No. 202180015159.9, mailed May 31, 2025.

* cited by examiner

ION GUIDE ASSEMBLY HAVING MULTIPLE ION GUIDES

CROSS-REFERENCE TO RELATED APPLICATIONS

This application is a U.S. national phase filing claiming the benefit of and priority to International Patent Application No. PCT/GB2021/050689, filed Mar. 19, 2021, which claims priority from and the benefit of United Kingdom patent application No. 2004014.3 filed on 19 Mar. 19, 2020. The entire contents of this application these applications are incorporated herein by reference.

FIELD OF THE INVENTION

The present invention relates generally to a mass spectrometer and/or ion mobility spectrometer, and in particular to an ion guide assembly for guiding ions through such a spectrometer.

BACKGROUND

It is desirable to align multiple ion guides with each other and/or with other ion optical devices in a mass or mobility spectrometer. However, aligning the ion guiding paths of such components can be difficult to achieve and maintain, particularly when certain ion optical devices need to be removed and replaced.

SUMMARY

The present invention provides an ion guide assembly comprising:
  two planar mounting components; and
  first and second ion guides mounted on the two planar mounting components such that the ion guides are spaced apart from each other;
  wherein at least one of the planar mounting components has an aperture therethrough that is located between the positions on said at least one mounting component at which the first and second ion guides are mounted.

The aperture in said at least one of the planar mounting components is sized and configured to enable an ion-optical device to be inserted through the aperture into the space between the first and second ion guide. The ion optical device is configured to receive ions from the first ion guide and transport ions into the second ion guide.

The aperture may have a size in the dimension between the first and second ion guides that is selected from the group consisting of: ≥5 mm; ≥10 mm; ≥15 mm; ≥20 mm; ≤30 mm; ≤25 mm; ≤20 mm; ≤10 mm; or between 5 and 20 mm; and/or the aperture may have a size in the dimension orthogonal to the direction between the first and second ion guides that is selected from the group consisting of: ≥5 mm; ≥10 mm; ≥15 mm; ≥20 mm; ≥25 mm; ≥30 mm; ≤40 mm; ≤35 mm; ≤30 mm; ≤25 mm; ≤20 mm; ≤15 mm; between 5 and 30 mm; or between 10 and 25 mm. The aperture may have a combination of any one of the sizes listed for the dimension between the first and second ion guides with any one of the sizes listed for the orthogonal dimension.

The aperture may be rectangular, square or another shape such as oval.

The aperture may be completely surrounded by material of the planar mounting component, i.e. as opposed to being slotted from the outside edge of the planar mounting component.

The two planar mounting components may be arranged with their major faces facing each other, and the first and second ion guides may be located between the two planar mounting components.

The planar mounting components may be rigid.

The planar mounting components may be arranged parallel to each other.

The first and/or second ion guide may be directly mounted to both of the mounting components.

The first and/or second ion guide comprises a plurality of electrodes that are arranged to define an elongated ion guiding path.

The first ion guide defines a first axis along which it guides ions and the second ion guide defines a second axis along which it guides ions, wherein the first and second axes may be coaxial.

The first and/or second ion guide may comprise a plurality of apertured electrodes that are spaced apart along the axial length of the ion guide, wherein the apertures in the electrodes are aligned so as to define a tunnel through which ions are guided in use.

The first and/or second ion guide may comprise a multipole ion guide, such as quadrupole rod set ion guide.

The ion guide assembly may comprise one or more voltage supply connected to electrodes of each ion guide for applying voltages to those electrodes. For example, the ion guide may comprise an RF voltage supply for applying an RF voltage to the electrodes of the first and/or second ion guide in order to radially confine the ions to the ion guiding path through the ion guide. In embodiments in which one or both of the ion guides is formed from axially spaced electrodes (such as apertured electrodes or a segmented multipole rod set), opposite phases of an RF voltage may be applied to axially alternate electrodes so as to provide the radially confining force on the ions.

The ion guide assembly may comprise one or more DC voltage supply for applying DC voltages to the electrodes of the first and/or second ion guide in order to urge ions axially along the ion guide. For example, the one or more DC voltage supply may be configured to successively apply a transient DC voltage to different electrodes, or different groups of multiple electrodes, along the ion guide so as to travel the transient DC voltage along the ion guide one or more times so as to urge ions along the ion guide.

Alternatively or additionally, the one or more DC voltage supply may be configured to simultaneously apply different DC voltages to different electrodes along the ion guide so as to generate an axial electric field along the ion guide.

One or both of the two mounting components may be a printed circuit board having electrical contacts thereon. Electrodes of the first and/or second ion guide may be electrically connected to said electrical contacts for applying voltages to the first and/or second ion guide via the PCB.

The PCB may be a component containing electrical contacts in the form of conductive tracks, pads and other features that have been etched from, printed on, or deposited on one or more sheet layers of material that is laminated onto a sheet layer of a non-conductive substrate.

At least the space between the two planar mounting components that is around the first ion guide may be sealed so as to define a first gas cell in which the first ion guide is located; and/or at least the space between the two planar mounting components that is around the second ion guide may be sealed so as to define a second gas cell in which the second ion guide is located.

Each of the first and/or second gas cells may be gas tight apart from the entrance and exit orifices of the ion guide therein, e.g. such that these orifices act as differential pumping apertures between the upstream and downstream regions. However, it is contemplated that one or more holes may be arranged to extend through the sealed part, or a mounting component, in one or more location adjacent to the ion guide so as to control the gas flow or pressure within the ion guide.

The ion guide assembly may comprise at least one mounting fixture mounted to the planar mounting components for mounting the ion optical device to the mounting fixtures.

The mounting components may each comprise a slotted aperture in which the mounting fixture is located.

Each slotted aperture may be sized and configured such that opposing side edges of the slotted aperture prevent the mounting fixture from moving in a first dimension (y-dimension).

The mounting fixture may have surfaces that abut against the major surfaces of the planar mounting components. This may prevent the mounting fixture from moving in a second dimension (z-dimension).

The mounting fixture may comprise one or more projection that extends through a hole in one or both of the planar mounting components, respectively, and the one or more projection may be confined by the one or more hole, respectively, so as to prevent movement of the mounting fixture. The projection and hole may cooperate so as to prevent the mounting fixture from moving in at least a third dimension (x-dimension).

The mounting fixture may comprise screws, bolts, clips or other attachment mechanisms for mounting the ion optical device to the mounting fixture.

The present invention also provides a mass or mobility spectrometer comprising: an ion guide assembly as described herein; and a mass or mobility analyser downstream of the ion guide assembly.

The may comprise an ion optical device sized and configured to be inserted through the aperture in the planar mounting component and into the space between the first and second ion guides.

The ion optical device may be mounted to the planar mounting components between the first and second ion guides.

The ion optical device may be directly mounted on the planar mounting components or may be mounted to one or more of the mounting fixtures described herein.

The ion optical device may comprise a plurality of electrodes arranged so as to define and ion entrance and an ion exit that are configured such that when the ion optical device is arranged between the first and second ion guides the ion optical device is able to receive ions from the first ion guide through the ion entrance and transmit ions into the second ion guide through the ion exit.

The ion optical device may have a length between its ion entrance and ion exit that is smaller than the aperture in the dimension between the first and second ion guides.

The ion optical device may have a height that is smaller than the aperture in the dimension orthogonal to the direction between the first and second ion guides.

The ion optical device may comprise an ion guide having a form such as that described in relation to the first and/or second ion guide, such as an ion tunnel ion guide, a multipole ion guide, or an ion funnel ion guide.

The ion optical device may be a fragmentation device for fragmenting precursor analyte ions to form daughter ions, an activation device for activating ions, or a reaction device for reacting analyte ions with other ions or non-ionic molecules.

For example, the ion optical device may be a surface induced dissociation device (SID), an electron capture dissociation device (EDC), an electron impact dissociation device (EID), or a photo-dissociation device.

The activation device described herein may be configured and operated so as to cause one or more of the following: declustering of ions (i.e. dissociating clusters of analyte ions and adduct species so as to separate the analyte ions from the adduct species); imparting of energy to the ions so as to cause structural changes in the ions without fragmenting them (e.g. so as to change the conformation of the ion); and imparting of energy to the ions by colliding them with background gas molecules so as to cause them to fragment after the ions have been excited by another technique, such as having been exposed to electron capture or charge transfer conditions (e.g. ECD or ETD conditions). Accordingly, when the ion optical device is an activation device that causes ions to fragment after having been excited, the spectrometer may also comprise an excitation device for performing such excitation on the ions before they are activated in the activation device. For example, the excitation device may be an electron capture dissociation device, an electron transfer dissociation device, an electron emitter etc.

The spectrometer may comprise one or more vacuum chamber in which the ion guide assembly is arranged, and one or more vacuum pump for evacuating the one or more vacuum chamber. The spectrometer may be configured to control the vacuum pump so as to maintain the first and/or second ion guide at a pressure of at least 0.001 mbar.

The spectrometer may comprise one or more voltage supply configured to apply voltages to electrodes so as to cause ions to be accelerated into, or within, the first and/or second ion guide in order to collide the ions with background gas molecules and cause collision induced dissociation or collision induced activation.

The ions may be axially accelerated, e.g. by an axial potential difference, in order to achieve this. Alternatively, an AC voltage may be applied to electrodes of the first and/or second ion guide so as to oscillate the ions (e.g. in the radial or axial direction), in order to achieve collision induced dissociation or collision induced activation.

The spectrometer may comprise a pulsed ion source, pulsed ion trap, or ion gate upstream of the ion guide assembly for transmitting pulses of ions into the ion guide assembly.

Additionally, or alternatively, a separation device may be provided upstream of the ion guide assembly for temporally separating ions according to a physicochemical property such as ion mobility or mass to charge ratio. For example, an ion mobility separator (IMS) may be provided upstream of the ion guiding region so as to separate ions and transmit ions of different mobility into the ion guiding assembly at different times. Alternatively, or additionally, a mass selective ion trap or mass filter may be provided upstream of the ion guiding region so as to transmit ions of different mass to charge ratio into the ion guiding assembly at different times.

The spectrometer may comprise a closed-loop ion mobility separator.

The present invention also provides a method comprising: providing the mass or mobility spectrometer as described herein; and inserting the ion optical device through the aperture in the planar mounting component and into the space between the first and second ion guides.

The ion optical device may then be mounted directly, or indirectly (e.g. via the mounting fixtures), to the planar mounting components.

The method may further comprise removing the ion optical device, through the aperture in the planar mounting component, from the space between the first and second ion guides.

The present invention also provides a method of mass or mobility spectrometry comprising: providing a mass or mobility spectrometer as described herein; guiding ions through the first ion guide, into the ion optical device and then through the second ion guide; and mass or mobility analysing ions downstream of the second ion guide.

Although the ion guide assembly has been described as having two planar mounting components, it is contemplated that the first and second ion guides may instead be mounted on only a single planar mounting component, or on more than two planar mounting components.

Additionally, or alternatively, it is contemplated that the one or more mounting components need not be planar.

Accordingly, the present invention also provides an ion guide assembly comprising: a mounting component; and first and second ion guides mounted on the mounting component such that the ion guides are spaced apart from each other; wherein the mounting component has an aperture therethrough that is located between the positions on the mounting component at which the first and second ion guides are mounted.

BRIEF DESCRIPTION OF THE DRAWINGS

Various embodiments will now be described, by way of example only, and with reference to the accompanying drawings in which.

DETAILED DESCRIPTION

Figure 1:
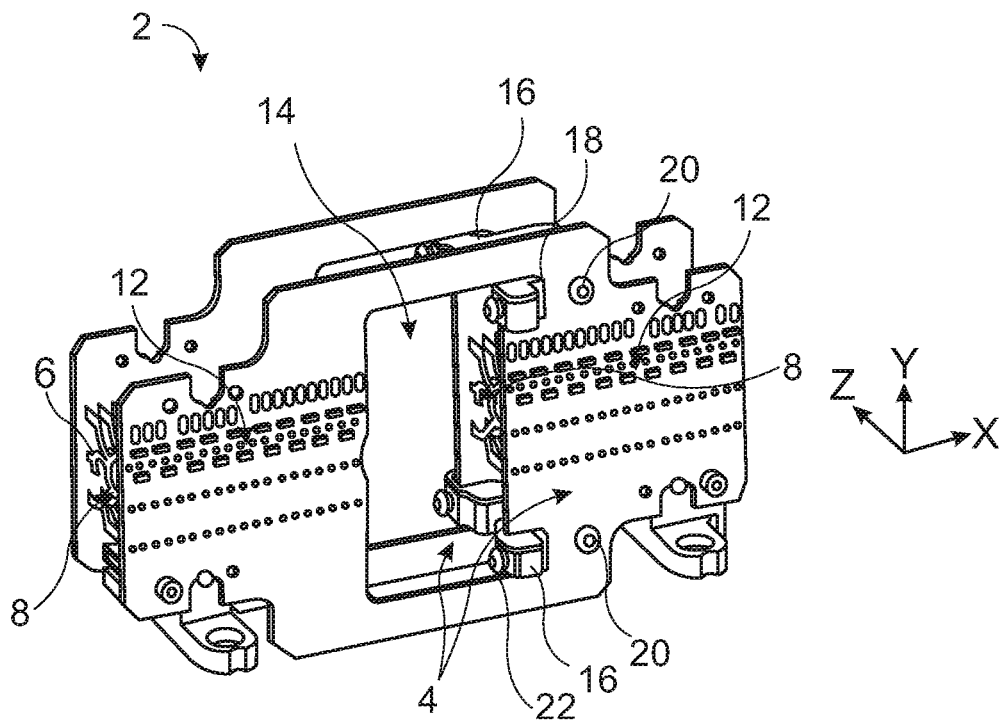
FIG. 1 shows a schematic, perspective view of an ion guide assembly according to an embodiment of the present invention.
Figure 2:
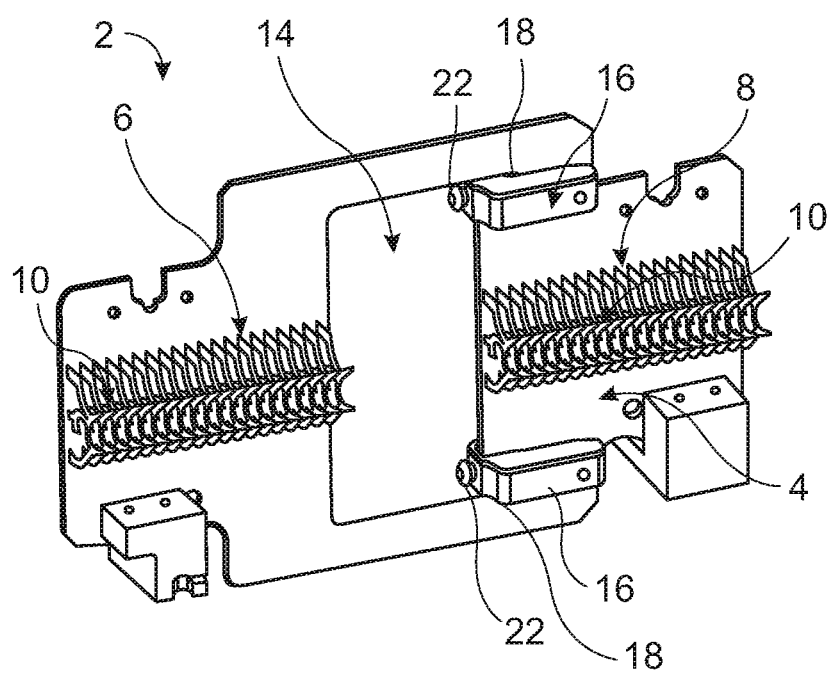
FIG. 2 shows a sectional view of a portion of the ion guide assembly shown in FIG. 1.

FIG. 1 shows a schematic, perspective view of an ion guide assembly 2 according to an embodiment of the present invention, and FIG. 2 shows a sectional view of a portion of the same embodiment.

The ion guide assembly 2 comprises two planar mounting components 4 that are arranged in parallel and with their major faces facing each other. A first ion guide 6 is arranged between, and directly mounted to, both of the mounting components 4. Similarly, a second ion guide 8 is arranged between, and directly mounted to, both of the mounting components 4. Each of the first and second ion guides 6,8 comprises a plurality of electrodes 10 that are arranged to define an elongated ion guiding path. In the depicted embodiment, each of the first and second ion guides comprises a plurality of apertured electrodes 10 that are spaced apart along the axial length of the ion guide 6,8, wherein the apertures in the electrodes 10 are aligned so as to define a tunnel through which ions are guided in use (i.e. the ion guides are ion tunnel ion guides or stacked ring ion guides). However, it is contemplated that one or both of the ion guides 6,8 may be a different type of ion guide. For example, one or both of the ion guides may be a multipole ion guide, such as quadrupole rod set ion guide.

Voltage supplies are connected to the electrodes 10 of each ion guide 6,8 for applying voltages to those electrodes for the usual purposes in an ion guide. For example, RF voltages may be applied to the electrodes 10 of each ion guide 6,8 in order to radially confine the ions to the ion guiding path through the ion guide. In embodiments in which one or both of the ion guides 6,8 is formed from axially spaced apertured electrodes 10, opposite phases of an RF voltage may be applied to axially alternate electrodes so as to provide the radially confining force on the ions. Alternatively, or additionally, DC voltages may be applied to electrodes 10 of one or both of the ion guides 6,8, e.g. in order to urge ions axially along one or both of the ion guides. For example, a transient DC voltage may be travelled along the ion guide 6,8 one or more times so as to urge ions along the ion guide. Each time the transient DC voltage is travelled along the ion guide, the transient DC voltage may be successively applied to different electrodes 10, or successively applied to different groups of multiple electrodes, along the ion guide so that the transient DC voltage moves along the ion guide. As the transient DC voltage generates a potential barrier, when the transient DC voltage moves along the ion guide 6,8 the potential barrier urges ions along the ion guide. Alternatively, or additionally, to travelling a transient DC voltage along the ion guide, ions may be urged along the ion guide by simultaneously applying different DC voltages to different electrodes of the ion guide so as to generate an axial electric field along the ion guide.

It is contemplated that one or both of the mounting components 4 may be a printed circuit board (PCB) and that the electrodes 10 of the ion guides 6,8 may be electrically connected to electrical contacts 12 on the PCB(s), such that the voltages may be supplied to the electrodes 10 of the ion guides 6,8 via the PCB. This provides mounting components 4 that both maintain mechanical alignment of the two ions guides 6,8 and also enable voltages to be easily applied to their electrodes 10.

The first and second ion guides 6,8 are spaced apart from each other. The downstream end of the first ion guide 6 is spaced apart from the upstream end of the second ion guide 8 along a direction corresponding to the ion guiding axis through the first ion guide 6. As will be described further below, this allows an ion optical device to be inserted into the space between the ion guides 6,8 so as to receive ions from the first ion guide 6 and transmit ions into the second ion guide 8. The ion guiding axis of the first ion guide 6 may be substantially parallel to the ion guiding axis through the second ion guide 8. The ion guiding axis through the first ion guide 6 may be coaxial with the ion guiding axis through the second ion guide 8, although it is contemplated that the ion guiding axes of the ion guides 6,8 may not be coaxial and may be offset from each other, e.g. in the radial direction of the ion guides 6,8.

An aperture 14 is provided through one or both of the planar mounting components 4, at the portion of the planar mounting component 4 between the portions at which the first and second ion guides 6,8 are mounted. The aperture 14 is positioned so as to allow an ion optical device to be inserted through the aperture 14 in the mounting component 4 and into the space between the ion guides 6,8 such that the ion optical device is aligned with the first and second ion guides 6,8. This enables ions being guided through the first ion guide 6 to pass into the ion optical device, and ions leaving the ion optical device to pass into the second ion guide 8 so as to be guided downstream thereby. For example, the ion optical device may be a fragmentation device for fragmenting precursor analyte ions to form daughter ions, e.g. the ion optical device may be a surface induced dissociation device (SID), an electron capture dissociation device (ECD), an electron impact dissociation device (EID), or a photo-dissociation device such as an ultraviolet photo-dissociation (UVPD) device or an infrared photo-dissociation (IRPD) device. Alternatively, the ion optical device may be an activation device (e.g. for activating ionic clusters so as to dissociate them into analyte ions and adduct species), or a reaction device for reacting analyte ions with other ions or non-ionic molecules (e.g. to fragment the analyte ions or transfer charge to them).

Once the ion optical device is inserted through one of the apertures 14 of one of the mounting components 4, it may be mounted directly to the two mounting components 4, e.g. via screws, bolts, clips, welding or soldering (not shown). Alternatively, as shown in FIGS. 1 and 2, mounting fixtures 16 may be mounted to the mounting components 4 and the ion optical device may be mounted to the mounting fixtures 16.

In the depicted embodiment, the apertures 14 in the mounting components 4 have the same shape and size and are at coincident locations, although this need not be the case. Each aperture 14 comprises a relatively large main portion for inserting the ion optical component therethrough and also a slotted portion 18 at an upper end thereof for receiving a mounting fixture 16 that extends between the two mounting components 4. Each slotted portion 18 receives the mounting fixture 16 and is sized and configured such that opposing side edges of the slotted portion 16 prevent the mounting fixture from moving in a first dimension (y-dimension). The mounting fixture 16 may also be configured such that when it is arranged in the slotted portions 18, outwardly facing surfaces of the mounting fixture 16 (in the z-dimension) abut against the internally facing major surfaces of the mounting components 4, so as to prevent the mounting fixture 16 from moving in a second dimension (z-dimension). Each of these outwardly facing surfaces of the mounting fixture 16 may also comprise a projection 20 that extends through a hole in each of the mounting components 4 that is spaced apart from the aperture 14, so as to prevent the mounting fixture 16 from moving in at least a third dimension (x-dimension). The mounting fixture 16 may comprise screws 22 or other attachment means, such as bolts or clips, for mounting the ion optical device to it. Alternatively, the ion optical device may be welded or soldered to the mounting fixture 16.

Each aperture 14 in the mounting component 4 may also comprise a second slotted portion 18 at a lower end thereof for receiving a second mounting fixture 16 that extends between the two mounting components 4. The second slotted portion 18 and second mounting fixture 16 may be configured in a corresponding manner to that described above, and the ion optical device may also be mounted to the second mounting fixture in a corresponding manner to that described above. Although the slotted portions 18 have been described as being in upper and lower portions of the mounting components 4 in the y-dimension, the y-dimension may not be vertical and may be in any orientation.

In use, ions from an ion source are guided into the first ion guide 6 of the ion guide assembly 2. The ions then pass from the first ion guide 6 into the ion optical device (e.g. a dissociation or activation device) that has been mounted to the mounting components 4 of the ion guide assembly 2. The ions are processed within the ion optical device, e.g. by being dissociated or fragmented. The resulting ions then pass into the second ion guide 8 of the ion guide assembly 2 and are transmitted downstream by it to a mass or mobility analyser, wherein the ions are mass or mobility analysed.

It is contemplated that the ion guide assembly 2 may be arranged within a mass or mobility spectrometer such that the first ion guide 6 and/or second ion guide 8 and/or ion optical device is maintained at the desired pressure(s). For example, any one or more of these devices may be maintained at a relatively low pressure such that ions being transmitted therethrough have relatively few or substantially no collisions with background gas molecules. Alternatively, or additionally (i.e. for a different device), any one or more of these devices may be maintained at a relatively high pressure such that ions being transmitted therethrough have a relatively high rate of collisions with background gas molecules. The pressures at which the various devices are maintained may be controlled by arranging them on one or more chamber and using one or more vacuum pump to reduce the pressure in the one or more chamber below atmospheric pressure.

The ion guide assembly may also be designed to control the pressure and/or gas flows within the ion path therethrough. For example, the space between the mounting components 4 that is around the first ion guide 6 may be sealed so as to define a gas cell in which the first ion guide 6 is located. The gas cell may be gas tight apart from the entrance and exit orifices of the first ion guide 6, e.g. such that these orifices act as differential pumping apertures between the upstream and downstream regions. However, it is contemplated that one or more holes may be arranged to extend through the sealed part, or a mounting component 4, in one or more location adjacent to the first ion guide 6 so as to control the gas flow or pressure within the first ion guide 6. For example, gas may be introduced into, or evacuated from, the first ion guide 6 through such a hole. Alternatively, or additionally, the second ion guide 8 may be sealed in a manner corresponding to that described above.

The first ion guide 6 and/or second ion guide 8 and/or ion optical device may be maintained at a relatively high pressure, e.g. approximately 0.001 mbar or higher. The background gas that is maintained at this pressure may be an inert gas, such as nitrogen. In such relatively high pressures, the ions passing through the first and/or second ion guide 6,8 (and/or ion optical device) are conditioned by collisions with the background gas molecules, which improves the ion capture and transmission to the immediately adjacent downstream device (and possibly one or more device further downstream). In these pressure regimes, RF voltages may be applied to the electrodes 10 of the first ion guide 6 and/or second ion guide 8 and/or ion optical device so as to radially confine the ions therein, as has been described above. Embodiments are contemplated in which the collision induced dissociation (CID) or collision induced activation are performed in the first ion guide 6 and/or second ion guide 8 and/or ion optical device maintained a such a relatively high pressure. For example, voltages may be applied to the instrument so as to cause ions to be accelerated into, or within, one or more of these devices in order to collide the ions with the background gas molecules and cause CID or collision induced activation. The ions may be axially accelerated, e.g. by an axial potential difference, in order to achieve this. Alternatively, an AC voltage may be applied to electrodes of the one or more devices so as to oscillate the ions (e.g. in the radial or axial direction), in order to achieve CID or collision induced activation.

It is also contemplated that the first ion guide 6 and/or second ion guide 8 and/or ion optical device may be maintained at a relatively low pressure, e.g. such that there are relatively few or substantially no collisions between the ions and background gas. At such pressures, RF confinement of the ions may still be desirable, although it may not be required if the device is relatively short such that ion collisions with background gas molecules are minimised.

The ion guide assembly 2 may be provided downstream of a device that provides a relatively short temporal profile (e.g. <100 milliseconds) for ions having desirable physico-chemical properties. The relatively short temporal profile maybe provided by a range of techniques such as, but not limited to, providing ions into the ion guide assembly 2 from a pulsed ion source, from an ion accumulation region such as an ion trap, or by gating the transmission of ions into the ion guide assembly 2 using an ion gate. Additionally, or alternatively, the relatively short temporal profile may be provided using a separation device that provides ions that are temporally separated according to a physicochemical property such as, but not limited to, ion mobility or mass to charge ratio. For example, an ion mobility separator (IMS) may be used to separate ions and transmit them into the ion guide assembly. Alternately, a mass to charge separator may be used to separate ions and transmit them into the ion guide assembly, e.g. such as by mass selectively ejecting ions of different mass to charge ratios from an ion trap and into the ion guide assembly at different times, or by transmitting ions through a mass filter (such as a quadrupole mass filter) having a mass transmission window that is scanned or stepped with time.

In the embodiments that provide ions with a relatively short temporal profile, it may be desirable to control the transit time of the ions through the first ion guide 6 and/or second ion guide 8 and/or ion optical device (and optionally further downstream regions), e.g. so as to maintain the fidelity of the temporally separated ions. This may be achieved by applying an axial electric field to, or by travelling a transient DC voltage along, the first ion guide 6 and/or second ion guide 8 and/or ion optical device in order to urge the ions along axially. As described above with respect to the first and second ion guides 6,8, this may be achieved by providing each device with axially spaced electrodes and applying DC voltages to these electrodes so as to form the axial electric field or to travel the transient DC voltage. Dedicated electrodes may be provided for generating the axial electric field or to travel the transient DC voltage. Alternatively, these DC voltages may be provided to electrodes of the device that perform other functions, such as RF confinement electrodes. Less preferably, the transit of ions through the devices may be controlled by varying a gas flow through the devices. Although embodiments have been described in which ions are provided to the ion guide assembly 2 with a with a relatively short temporal profile, it is contemplated that this need not be the case.

The ion guide assembly 2 described herein may be incorporated into various different instrument geometries, some of which are shown in FIGS. 3-9. Generally, one or more of the following devices may be arranged upstream and/or downstream of the ion guide assembly 2: an ion source, a mass analyser, a mass separator, a mass filter, an ion mobility based analyser, an ion mobility based separator, an ion mobility filter, and a fragmentation device.

Figure 3:
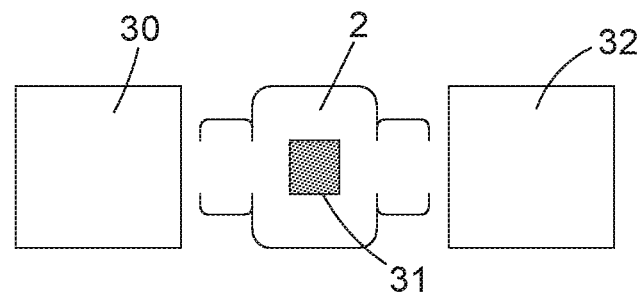
FIGS. 3-9 show the locations of components in spectrometers according different embodiments of the present invention.

FIG. 3 shows an embodiment in which the ion guide assembly 2 is arranged between an ion source 30 and a mass analyser 32. The ion optical device 31 is arranged within the ion guide assembly. In use, ions from the ion source 30 are guided into the first ion guide 6 of the ion guide assembly 2. The ions then pass from the first ion guide 6 into the ion optical device 31 (e.g. dissociation or activation device) that has been mounted to the mounting components of the ion guide assembly. The ions are processed within the ion optical device 31, e.g. by being dissociated or fragmented. The resulting ions then pass into the second ion guide 8 of the ion guide assembly 2 and are transmitted downstream by it to the mass analyser 32, wherein the ions are mass analysed.

Figure 4:
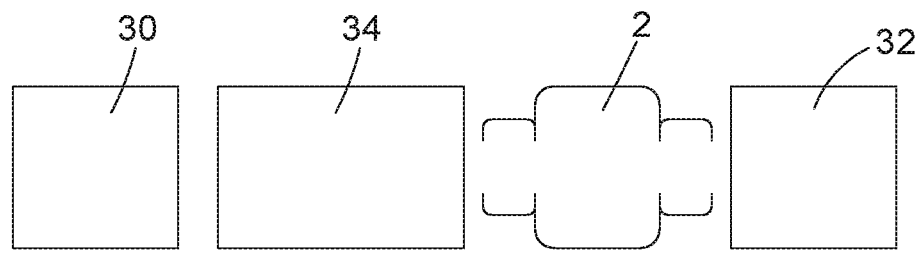

FIG. 4 shows an embodiment that is the same as that of FIG. 3, except wherein a mass filter 34, such as a resolving quadrupole mass filter (i.e. having RF and DC voltages), is arranged between the ion source 30 and the ion guide assembly 2. The mass filter 34 may be operated so as to have a mass transmission window such that it selectively transmits only ions of a certain mass to charge ratio to the ion guide assembly 2. The voltages that are applied to the electrodes of the mass filter 34 may be varied with time such that the mass filter transmits (only) ions having different mass to charge ratios at different times, e.g. by substantially continuously scanning or stepping the mass to charge ratios that are transmitted. It is also contemplated that in another mode the mass filter 34 may be operated as an ion guide that transmits all ions (e.g. RF only ion guide)

Figure 5:
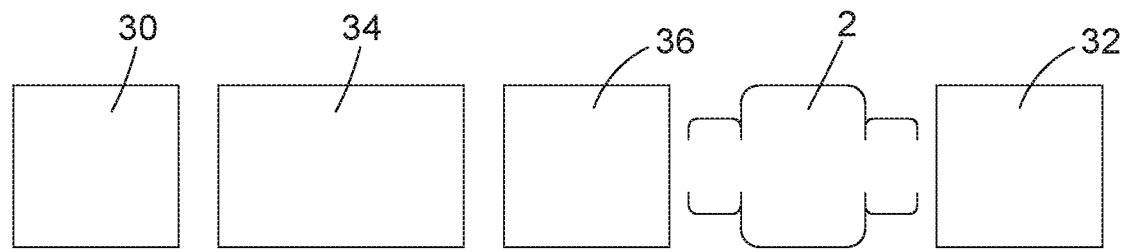

FIG. 5 shows an embodiment that is the same as that of FIG. 4, except that an ion mobility separator (IMS) 36 is arranged between the mass filter 34 and the ion guide assembly 2. Ions transmitted by the mass filter 34 may be separated in the IMS device 36 such that ions of different mobility reach the ion guide assembly 2 at different times. The IMS device 36 may be a drift IMS device in which the ions are urged through a gas towards the exit of the device, e.g. by a static voltage gradient or by travelling a transient DC voltage along the IMS device, such that ions having different mobilities have different transit times through the IMS device. Alternatively, the IMS device may be a FAIMS device that is operated such that ions having different FAIMS mobilities exit at different times. The mass filter 34 may be operated as described in relation to FIG. 4 (e.g. scanned or stepped) and the ions transmitted thereby may be separated in the downstream IMS device 36. The IMS may be operated in synchronism with the mass filter, e.g. so that the combination of the two devices transmits ions having a selected charge state.

Figure 6:
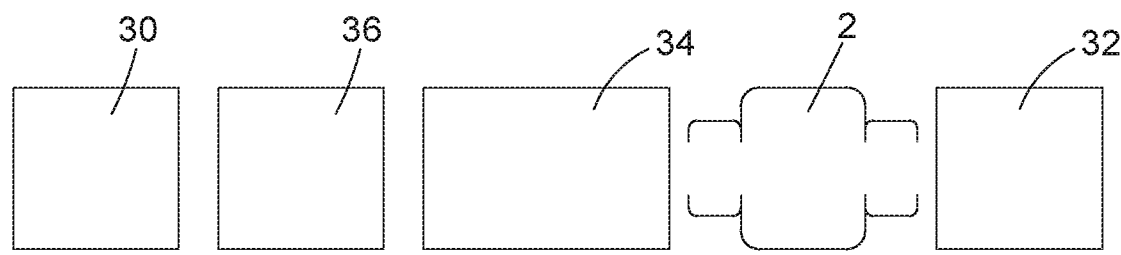

FIG. 6 shows an embodiment that is the same as that of FIG. 5, except that the order of the mass filter 34 and IMS device 36 has been reversed.

Figure 7:
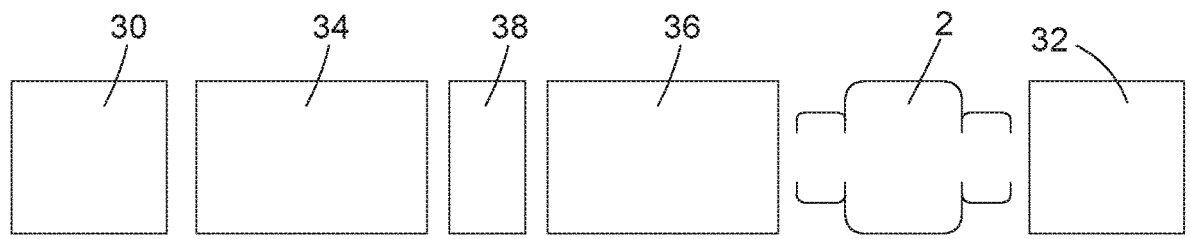

FIG. 7 shows an embodiment that is the same as that of FIG. 5, except that the IMS device 36 is an orthogonal IMS device or a closed-loop IMS device, e.g. such as that disclosed in WO 2015/155551. An ion trap 38 may be arranged upstream of the IMS device 36, for trapping and releasing ions towards the IMS device.

Figure 8:
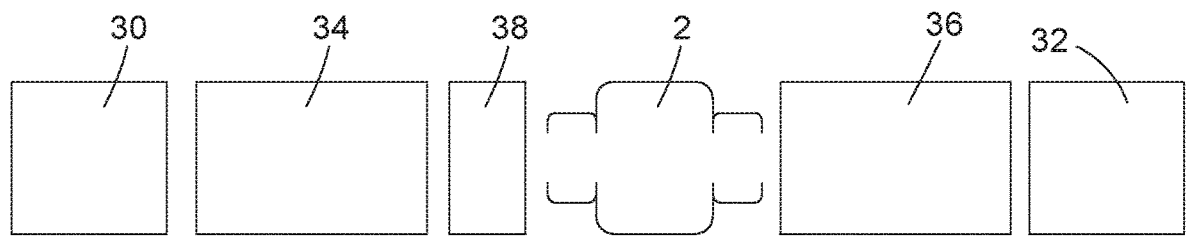
Figure 9:
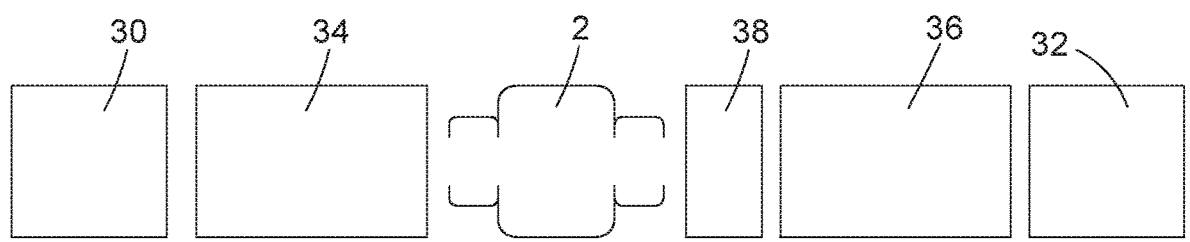

FIG. 8 shows an embodiment that is the same as that of FIG. 7, except that the position of the ion guide assembly 2 is between the ion trap 38 and the IMS device 36. FIG. 9 shows an embodiment that is the same as that of FIG. 7, except that the position of the ion guide assembly 2 is between the mass filter 34 and the ion trap 38. In the embodiments described herein the mass analyser at the downstream end of the instrument is preferably a Time of Flight (ToF) mass analyser, quadrupole mass analyser, Fourier transform mass analyser or ion trap mass analyser.

Although the present invention has been described with reference to preferred embodiments, it will be understood by those skilled in the art that various changes in form and detail may be made without departing from the scope of the invention as set forth in the accompanying claims.

For example, the disclosure has been described in the context of upstream and downstream directions, however the direction of ion movement through the instrument may be reversed so as to pass ions back and forth along the ion guides. For example, precursor ions may be passed through the instrument in a downstream direction and fragmented in the ion optical device. The fragment ions may then be passed back upstream, before being transmitted in the downstream direction so as to be analysed.

The invention claimed is:

1. An ion guide assembly comprising:
   two planar mounting components;
   first and second ion guides mounted on the two planar mounting components such that the ion guides are spaced apart from each other, wherein at least one of the planar mounting components has an aperture therethrough that is located between the positions on said at least one mounting component at which the first and second ion guides are mounted; and
   an ion optical device sized and configured to be inserted through the aperture in the planar mounting component and into the space between the first and second ion guides.

2. The ion guide assembly of claim 1, wherein the aperture has a size in the dimension between the first and second ion guides that is selected from the group consisting of: ≥5 mm; ≥10 mm; ≥15 mm; ≥20 mm; ≤30 mm; ≤25 mm; ≤20 mm; ≤10 mm; or between 5 and 20 mm; and/or
   wherein the aperture has a size in the dimension orthogonal to the direction between the first and second ion guides that is selected from the group consisting of: ≥5 mm; ≥10 mm; ≥15 mm; ≥20 mm; ≥25 mm; ≥30 mm; ≤40 mm; ≤35 mm; ≤30 mm; ≤25 mm; ≤20 mm; ≤15 mm; between 5 and 30 mm; or between 10 and 25 mm.

3. The ion guide assembly of claim 1, wherein the two planar mounting components are arranged with their major faces facing each other, and wherein the first and second ion guides are located between the two planar mounting components.

4. The ion guide assembly of claim 1, wherein the first ion guide defines a first axis along which it guides ions and the second ion guide defines a second axis along which it guides ions, wherein the first and second axes are coaxial.

5. The ion guide assembly of claim 1, wherein one or both of the two mounting components is a printed circuit board having electrical contacts thereon, and wherein electrodes of the first and/or second ion guide are electrically connected to said electrical contacts for applying voltages to the first and/or second ion guide via the PCB.

6. The ion guide assembly of claim 1, wherein space between the two planar mounting components and around the first ion guide is sealed so as to define a first gas cell in which the first ion guide is located; and/or
   wherein space between the two planar mounting components and around the second ion guide is sealed so as to define a second gas cell in which the second ion guide is located.

7. The ion guide assembly of claim 1, comprising at least one mounting fixture mounted to the planar mounting components for mounting the ion optical device to the mounting fixtures.

8. The ion guide assembly of claim 7, wherein the mounting components each comprise a slotted aperture in which the mounting fixture is located.

9. The ion guide assembly of claim 7, wherein the mounting fixture has surfaces that abut against the major surfaces of the planar mounting components.

10. The ion guide assembly of claim 7, wherein the mounting fixture comprises one or more projection that extends through a hole in one or both of the planar mounting components, respectively, and wherein the one or more projection is confined by the one or more hole, respectively, so as to prevent movement of the mounting fixture.

11. The ion guide assembly of claim 7, wherein the mounting fixture comprises screws, bolts, clips or other attachment mechanisms for mounting the ion optical device to the mounting fixture.

12. The ion guide assembly of claim 1, wherein the ion optical device is mounted to the planar mounting components between the first and second ion guides.

13. The ion guide assembly of claim 1, wherein the ion optical device comprises a plurality of electrodes arranged so as to define and ion entrance and an ion exit that are configured such that when the ion optical device is arranged between the first and second ion guides the ion optical device is able to receive ions from the first ion guide through the ion entrance and transmit ions into the second ion guide through the ion exit.

14. The ion guide assembly of claim 1, wherein the ion optical device is a fragmentation device for fragmenting precursor analyte ions to form daughter ions, an activation device for activating ions, or a reaction device for reacting analyte ions with other ions or non-ionic molecules.

15. A mass or mobility spectrometer comprising:
    an ion guide assembly as claimed in claim 1; and
    a mass or mobility analyser downstream of the ion guide assembly.

16. The spectrometer of claim 15, comprising one or more vacuum chamber in which the ion guide assembly is arranged, and one or more vacuum pump for evacuating the one or more vacuum chamber, wherein the spectrometer is configured to control the vacuum pump so as to maintain the first and/or second ion guide at a pressure of at least 0.001 mbar.

17. The spectrometer of claim 15, comprising a closed-loop ion mobility separator.

18. A method comprising:
    providing the ion guide assembly, or mass or mobility spectrometer, of claim 15; and
    inserting the ion optical device through the aperture in the planar mounting component and into the space between the first and second ion guides.

19. A method of mass or mobility spectrometry comprising:
    providing the mass or mobility spectrometer of claim 15;
    guiding ions through the first ion guide, into the ion optical device and then through the second ion guide; and
    mass or mobility analysing ions downstream of the second ion guide.

20. An ion guide assembly comprising:
    a mounting component;
    first and second ion guides mounted on the mounting component such that the ion guides are spaced apart from each other, wherein the mounting component has an aperture therethrough that is located between the positions on the mounting component at which the first and second ion guides are mounted; and
    an ion optical device sized and configured to be inserted through the aperture in the mounting component and into the space between the first and second ion guides.

* * * * *